US009600496B1

(12) United States Patent
Ovsjanikov et al.

(10) Patent No.: US 9,600,496 B1
(45) Date of Patent: *Mar. 21, 2017

(54) SYSTEM AND METHOD FOR ASSOCIATING IMAGES WITH SEMANTIC ENTITIES

(71) Applicant: Google Inc., Mountain View, CA (US)

(72) Inventors: Maks Ovsjanikov, Menlo Park, CA (US); Yuan Li, Los Angeles, CA (US); Hartwig Adam, Marina Del Rey, CA (US); Charles Joseph Rosenberg, Cupertino, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/850,275

(22) Filed: Sep. 10, 2015

Related U.S. Application Data

(63) Continuation of application No. 13/742,791, filed on Jan. 16, 2013, now Pat. No. 9,171,018.

(60) Provisional application No. 61/587,325, filed on Jan. 17, 2012.

(51) Int. Cl.
*G06F 17/30* (2006.01)

(52) U.S. Cl.
CPC .... *G06F 17/30256* (2013.01); *G06F 17/3053* (2013.01); *G06F 17/30542* (2013.01); *G06F 17/30867* (2013.01)

(58) Field of Classification Search
USPC ................................. 707/707, 748, 749, 732
See application file for complete search history.

(56) References Cited

U.S. PATENT DOCUMENTS

| | | | |
|---|---|---|---|
| 5,751,286 A | 5/1998 | Barber et al. | |
| 7,043,474 B2 | 5/2006 | Mojsilovic et al. | |
| 8,024,343 B2 | 9/2011 | Gallagher | |
| 8,280,887 B1 * | 10/2012 | Stork | G06F 17/30943 707/722 |
| 8,457,416 B2 * | 6/2013 | Liu | G06F 17/30247 382/229 |
| 8,510,337 B2 | 8/2013 | Rathus et al. | |
| 8,761,512 B1 * | 6/2014 | Buddemeier | G06K 9/6282 382/181 |
| 8,782,077 B1 | 7/2014 | Rowley et al. | |
| 8,923,655 B1 | 12/2014 | Weston et al. | |
| 8,977,639 B2 | 3/2015 | Petrou et al. | |
| 9,201,903 B2 * | 12/2015 | Buddemeier | G06K 9/6282 |

(Continued)

*Primary Examiner* — Debbie Le
(74) *Attorney, Agent, or Firm* — Lerner, David, Littenberg, Krumholz & Mentlik, LLP

(57) ABSTRACT

A system and computer-implemented method for associating images with semantic entities and providing search results using the semantic entities. An image database contains one or more source images associated with one or more images labels. A computer may generate one or more documents containing the labels associated with each image. Analysis may be performed on the one or more documents to associate the source images with semantic entities. The semantic entities may be used to provide search results. In response to receiving a target image as a search query, the target image may be compared with the source images to identify similar images. The semantic entities associated with the similar images may be used to determine a semantic entity for the target image. The semantic entity for the target image may be used to provide search results in response to the search initiated by the target image.

20 Claims, 5 Drawing Sheets

(56) References Cited

U.S. PATENT DOCUMENTS

| | | | |
|---|---|---|---|
| 9,280,563 B2 * | 3/2016 | Chittar | G06F 17/3025 |
| 2003/0195883 A1 * | 10/2003 | Mojsilovic | G06F 17/30256 |
| 2009/0254539 A1 | 10/2009 | Wen et al. | |
| 2009/0287669 A1 | 11/2009 | Bennett | |
| 2011/0128288 A1 | 6/2011 | Petrou et al. | |
| 2011/0131241 A1 | 6/2011 | Petrou et al. | |
| 2013/0016916 A1 * | 1/2013 | Mass | G06F 17/30265 |
| | | | 382/218 |

* cited by examiner

SYSTEM AND METHOD FOR ASSOCIATING IMAGES WITH SEMANTIC ENTITIES

CROSS-REFERENCE TO RELATED APPLICATIONS

The present application is continuation of U.S. patent application Ser. No. 13/742,791, filed Jan. 16, 2013, which claims the benefit of the filing date of U.S. Provisional Patent Application No. 61/587,325 filed Jan. 17, 2012, the disclosures of which are hereby incorporated herein by reference.

BACKGROUND

As more and more data is hosted on the Internet, new techniques have been developed for sorting, organizing, and accessing this information. One common tool is the Internet search engine. Search engines allow a user to input a text query and receive a list of results associated with that query. The user may then access the result they deem most relevant to their query to receive additional information.

However, not all searches can be easily represented by a text query. For example, a user may wish to identify a person in a photograph, an actor in a video, or a location on a map. Such scenarios require the user to identify a text query that approximates the contents of their image, often leading to inaccurate results. Other search engines may offer an image based search option, where a user may upload a target image to initiate a search based on features of the image. However, such search engines typically operate by identifying a text query associated with the target image, and then performing a search based on the text query. For example, a user might notice a large cat in their backyard, and take a photograph of the animal. Wishing to identify the type of animal, the user may perform an image search by uploading the photograph to an image search engine. The photograph may be associated with the text "jaguar," describing the large cat of the same name. However, the query might return results for the British car manufacturer JAGUAR, the sports team the JACKSONVILLE JAGUARS, and the animal panthera onca, commonly known as the jaguar. Although the context of the target image might indicate that the user wishes for more information on the cat, performing an image search in this manner does not properly account for the semantics or context of the image.

SUMMARY

Aspects of the disclosure provide a system and method for associating images with semantic entities. An image database contains one or more source images associated with one or more images labels. A computer may generate one or more documents containing the labels associated with each image. Analysis may be performed on the one or more documents to associate the source images with semantic entities. The semantic entities may be used to provide search results. In response to receiving a target image as a search query, the target image may be compared with the source images to identify similar images. The semantic entities associated with the similar images may be used to determine a semantic entity for the target image. The semantic entity for the target image may be used to provide search results in response to the search initiated by the target image.

Aspects of the disclosure describe a computer-implemented method for performing an image search using semantic entities. The method may include receiving a target image as a search query, identifying, using a processor, at least one similar image that has at least one feature in common with the target image, the at least one similar image associated with one or more semantic entities, determining at least one likely semantic entity using the semantic entities associated with the at least one similar image, and using the at least one likely semantic entity to provide search results for the target image. The method may further include determining a score for each of the one or more semantic entities, and identifying one or more entities with the highest score as the at least one likely semantic entity. The score for each of the semantic entities is determined by at least one of the similarity of the similar source image associated with each semantic entity to the target image and a confidence value indicating the likelihood that the semantic entity is correctly associated with the similar source image. The method may further include providing the at least one likely semantic entity as a search result. The method may further include using the at least one likely semantic entity to generate a search query, performing a search using the search query, and returning one or more results of the search as search results for the target image. The one or more similar source images may be associated with the one or more semantic entities by a method including analyzing the contents of a first document associated with the at least one similar image to determine the one or more semantic entities for association with the at least one similar image, the first document comprising one or more labels associated with the at least one similar image, storing data indicating an association of the at least one similar image with the at least one determined semantic entity, and identifying at least one likely semantic entity for the target image using the association of the at least one similar image with the determined semantic entity.

Aspects of the disclosure may further provide a non-transitory computer readable storage medium containing instructions, that when executed by a processor, cause the processor to perform a method. The instructions may include receiving a target image as a search query, identifying, using a processor, at least one similar image from among a plurality of source images, the at least one similar image having at least one feature in common with the target image, the at least one similar image associated with one or more semantic entities, determining at least one likely semantic entity using the semantic entities associated with at least one similar image, and using the at least one likely semantic entity to provide search results for the target image. The instructions may further include determining a score for each of the one or more semantic entities, and identifying one or more entities with the highest score as the at least one likely semantic entity. The score for each of the semantic entities may be determined by at least one of the similarity of a source image associated with each semantic entity to the target image and a confidence value indicating the likelihood that the semantic entity is correctly associated with the source image. The instructions may further include providing the at least one likely semantic entity as a search result. The instructions may include using the at least one likely semantic entity to generate a search query, performing a search using the search query, and returning one or more results of the search as search results for the target image. The instructions may further include analyzing the contents of a first document associated with the at least one similar image to determine the one or more semantic entities for association with at least one similar image, the first document comprising one or more labels associated with the at least one similar image, storing data indicating an association of the at least one similar image with the at least one determined semantic entity, and identifying at least one likely semantic entity for the target image using the association of the at least one similar image with the determined semantic entity.

Aspects of the disclosure may provide a processing system for performing an image search using semantic entities. The processing system may include a memory for storing one or more source images and one or more semantic entities associated with at least one of the one or more source images and at least one processor coupled to the memory. The processor may be configured to receive a target image as a search query, identify at least one similar image among the one or more source images, the at least one similar image having at least one feature in common with the target image, determine at least one likely semantic entity using the semantic entities associated with the at least one similar image, and use the at least one likely semantic entity to provide search results for the target image. The at least one processor may be further configured to determine a score for each of the one or more semantic entities, and identify one or more semantic entities with the highest score as the at least one likely semantic entity. The score for each of the semantic entities may be determined by at least one of the similarity of the similar source image associated with each semantic entity to the target image and a confidence value indicating the likelihood that the semantic entity is correctly associated with the similar source image. The processor may be further configured to provide the at least one likely semantic entity as a search result. The processor may be further configured to use the at least one likely semantic entity to generate a search query, perform a search using the search query, and return one or more results of the search as search results for the target image. The processor may be further configured to analyze the contents of a first document associated with the at least one similar image to determine the one or more semantic entities for association with the at least one similar, the first document comprising one or more labels associated with the at least one similar image, store data indicating an association of the at least one similar image with the at least one determined semantic entity, and identify at least one likely semantic entity for the target image using the association of the at least one similar image with the determined semantic entity.

DETAILED DESCRIPTION

Figure 1:
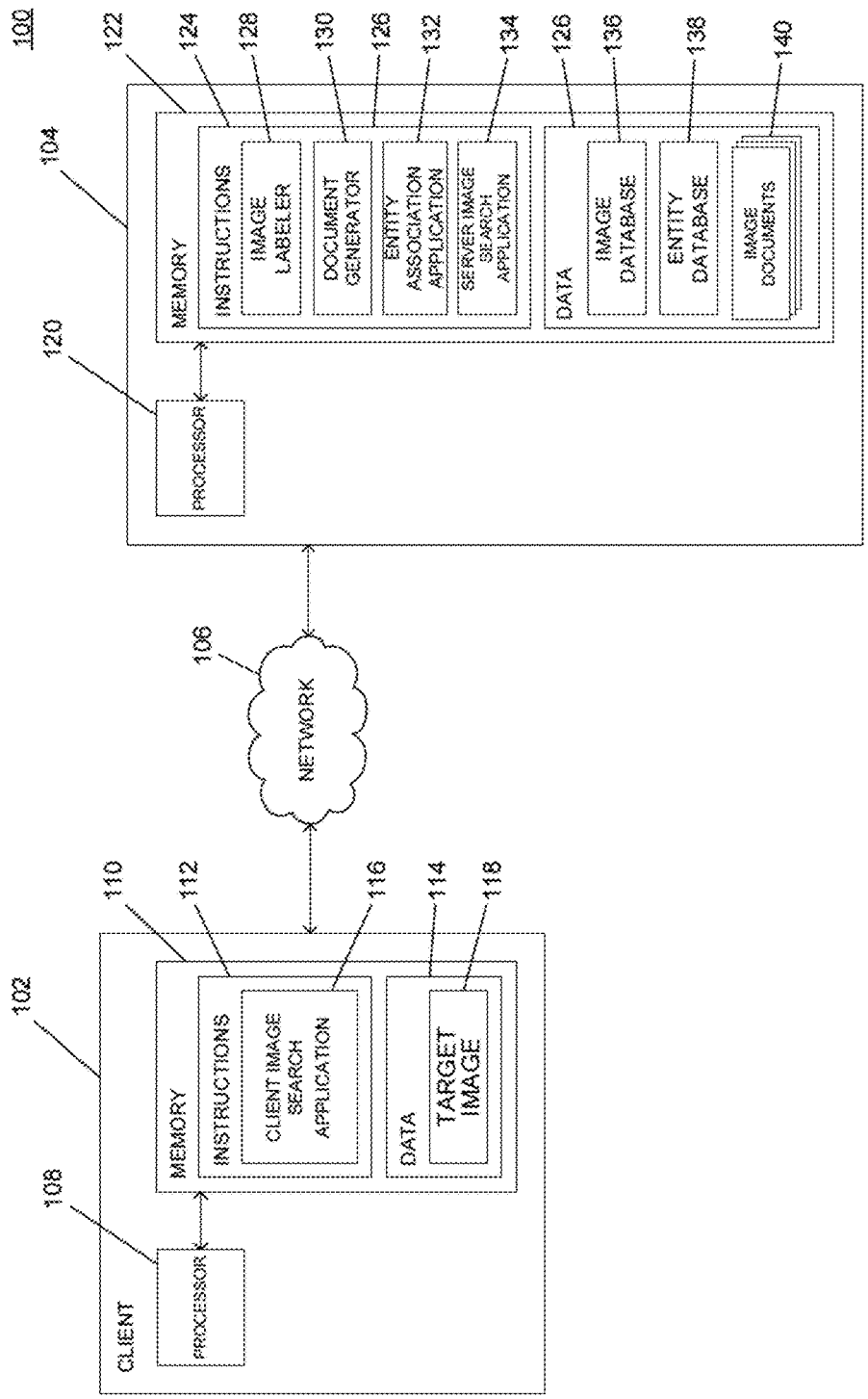
FIG. 1 is a system diagram depicting an example of an image search system in accordance with aspects of the disclosure.

The aspects, features and advantages of the present disclosure will be appreciated when considered with reference to the following description of preferred embodiments and accompanying figures. The following description does not limit the disclosure; rather, the scope is defined by the appended claims and equivalents.

While certain processes in accordance with example embodiments are shown in the figures as occurring in a linear fashion, this is not a requirement unless expressly stated herein. Different processes may be performed in a different order or concurrently.

The disclosure describes systems and methods for associating images with semantic entities, and performing image searches using the images associated with semantic entities. The term "semantic entity" is understood to mean a concept or topic associated with a particular ontology. A topic entry in Wikipedia or a concept entry in Freebase might be examples of semantic entities, where the topic or concept is provided with a shared structure and vocabulary. A semantic entity is typically associated with a unique identifier to aid in disambiguation of terms and concepts. For example, the text "jaguar" may be ambiguous if it is not clear that the text refers to the animal or the car. A reference to a semantic entity associated with the cat or the car would require no such disambiguation. Note that some semantic entities may exist for the purpose of disambiguating text terms and other references (e.g., a Wikipedia disambiguation page); these disambiguation entities may aggregate references to unique semantic entities. This structure and vocabulary may be used to access the data associated with the particular topic or concept.

The terms "source image" and "target image" are used to articulate the distinction between an image provided to execute a search operation, the "target image", and images that are used to associate the target image with a particular semantic entity, the "source images." In various embodiments, target images may become source images and vice-versa, such as, for example, including a target image in the image database as a source image once a semantic entity to be associated with the target image is determined. As such, these definitions are intended to provide context and clarity for the specification and claims in a non-limiting manner. A computing device for performing a search using an image may have access to a database of source images, where each of the source images may be associated with one or more labels. These labels may be used to create documents that are associated with the source images. The documents may be analyzed to identify an appropriate semantic entity for association with the source image.

When a user uploads a target image to perform an image search, similar source images to the target image may be identified. The semantic entities associated with the similar source images may be used to identify an appropriate semantic entity for the uploaded image. The appropriate semantic entity may be used to provide search results to the user.

FIG. 1 presents a schematic diagram of a computer system depicting various computing devices that can be used alone or in a networked configuration in accordance with aspects of the disclosure. For example, this Figure illustrates a computer network 100 with a client device 102, a server 104, in communication via a network 106. The client device 102 allows a user to upload a target image to initiate a search operation using the target image. The server 104 receives the target image and performs the search operation using the target image. The server 104 may also associate one or more source images (e.g., images stored in an image database 136) with semantic entities to facilitate the search operation.

The client device 102 may be computing device as known in the art. For example, the client device 102 may be laptop computer, a desktop computer, a netbook, a rack-mounted server, a smartphone, a cellular phone, or any other device containing programmable hardware or software for executing instructions. The computing device 102 may include a processor 108, a memory 110 and other components typically present in general purpose computers. The memory 110 may store instructions 112 and data 114 that are accessible by the processor 108. The processor 108 may execute the instructions 112 and access the data 114 to control the operations of the client device 102.

The processor 108 may be any suitable processor, such as various commercially available general purpose processors. Alternatively, the processor 108 may be a dedicated controller such as an application-specific integrated circuit ("ASIC") or a field-programmable gate array ("FPGA").

The memory 110 may be any type of tangible memory operative to store information accessible by the processor 108, including a computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The system and method may include different combinations of the foregoing, whereby different portions of the instructions and data are stored on different types of media.

Although FIG. 1 functionally illustrates the processor 108 and memory 110 as each being within a single block respectively, it should be understood that the processor 108 and memory 110 may actually comprise multiple processors and memories that may or may not be stored within the same physical housing. Accordingly, references to a processor, computer or memory will be understood to include references to a collection of processors, computers or memories that may or may not operate in parallel.

The instructions 112 may be any set of instructions to be executed directly (such as machine code) or indirectly (such as scripts) by the processor 108. For example, the instructions 112 may be stored as computer code on a non-transitory computer-readable medium. In that regard, the terms "instructions" and "programs" may be used interchangeably herein. The instructions 112 may be stored in object code format for direct processing by the processor 108, or in any other computer language including scripts or collections of independent source code modules that are interpreted on demand or compiled in advance. Functions, methods and routines of the instructions are explained in more detail below (see FIGS. 2-5).

In order to facilitate the operations of the client device 102, the instructions 112 may comprise a client image search application 116. The client image search application 116 provides an interface by which the client device 102 may upload a target image 118, stored in the data 114, to perform an image search operation. The client image search application 116 may be any application suitable for the purpose of providing the target image 118 to the server, such as a web browser displaying an image search web page, or an application installed on a desktop, laptop, or mobile phone. For example, the client device 102 may be a mobile phone that includes a camera module for capturing images. The user of the mobile phone may take a picture using the camera module, and submit the target image 118 to perform the image search using an application installed on the mobile phone. In another aspect, the client device 102 may be a desktop computer with one or more images saved in memory. The user of the desktop computer may navigate to a website for performing image searches, and upload the target image from memory to the website.

Data 114 may be retrieved, stored or modified by the processor 108 in accordance with the instructions. For instance, although the architecture is not limited by any particular data structure, the data may be stored in computer registers, in a relational database as a table having a plurality of different fields and records, Extensible Markup Language ("XML") documents or flat files. The data may also be formatted in any computer readable format such as, but not limited to, binary values or Unicode. The data may comprise any information sufficient to identify the relevant information, such as numbers, descriptive text, proprietary codes, references to data stored in other areas of the same memory or different memories (including other network locations) or information that is used by a function to calculate the relevant data.

The data 114 may store a target image 118. As described above, the target image 118 may be generated by the client device 102 or received from another source. For example, the target image 118 may be generated by a camera module included in or coupled with the client device 102, the target image 118 may be generated by an application executing on the client device 102, or the image may be received from an external source, such as over the network or via a removable storage device. The target image 118 may be stored in any compressed or uncompressed format, including, but not limited to, GIF, JPEG, JPEG2000, BMP, TIF, or RAW. The target image 118 may also be stored remotely, such as on a remote computer coupled to the client device 102 via the network 106, or on removable media.

The server 104 may function perform image search operations using the target image 118 provided by the client device 102. The server 104 may also associate one or more source images from an image database 136 with semantic entities to facilitate the image search operations. For example, the server 104 may receive the target image 118 provided by the client device, identify a semantic entity using similar source images identified within the image database, and return the identified semantic identify to the client device 102 as a search result.

The server 104 may be configured similarly to the client device 102, with a processor 120 coupled to a memory 122. The memory 122 may comprise a set of instructions 124 and data 126 to facilitate the operations of the server 104. The instructions 124 may include an image labeler 128, a document generator 130, an entity association application 132, and a server image search application 134. The data 126 may include an image database 136, an entity database 138, and a plurality of image documents 140. The image labeler 128 associates labels with one or more source images stored within the image database 136. The labels may include text strings that are associated with the source images. The labels may be encoded in image metadata, or stored in a separate dataset and linked to the respective image. Labels may be associated with the source images in a variety of manners. For example, the labels may be applied to the images by noting search queries in response to which the source image is provided in an Internet search operation, the labels may be manually applied to the source images by users, or the labels may be applied to the source images using optical character recognition or other machine learning techniques.

The document generator 130 creates an image document 140 for each source image or a group of source images using the labels applied to the images in the image database 136 by the image labeler 124. For example, if a source image is associated with three labels, the document generator 130 may generate an image document 140 containing the text of the three labels. Although the document 140 is described in this example as a text file, the document 140 could also be implemented in any suitable format for storing data identifying the labels, including but not limited to a random-access file, XML, a spreadsheet, or any other format. The document 140 may further comprise the image itself or the labels may be added to the image itself as image metadata, with the image itself used as the document 140. The document generator 130 may also aggregate data from similar images into a single document, or propagate labels across documents associated with similar images. For example, if a first image of the Eiffel Tower is associated with the label "Eiffel Tower," and a second image of the Eiffel Tower is associated with the label "Paris," then the document generator may identify that the two images contain the same landmark, and propagate the "Paris," label to the first image and the "Eiffel Tower" label to the second image (see FIG. 2). Images may be judged similar if they have at least one feature in common with one another. For example, the two images of the Eiffel Tower each show the same object, namely, the Eiffel Tower. Other features may be used to identify two or more images as similar images. For example, image metadata may be analyzed to identify images that were captured by the same user, at the same location, at the same time, and/or with the same device, visible image features such as particular pixel patterns, shapes, or colors may be identified, or any other method of determining that images have or are likely to have similar content. The document generator 130 may also aggregate data from web-documents (e.g. html) in which the source images are embedded if the source documents are added to the image database 136 from the web.

The entity association application 132 associates the image documents 140 with semantic entities. As described above, semantic entities are topics or concepts defined by a particular structure of vocabulary, such as those entities contained within an entity database 138. For example, the websites Wikipedia and Freebase are categorized by semantic entities, with each semantic entity associated with one or more pages. The semantic entities may be associated with text terms, or they may have additional disambiguation data. For example, the movie "Mona Lisa," and the painting "Mona Lisa," have the same title, but different subject matter. As such, the movie may be associated with a "Mona Lisa(movie)," semantic entity, while the painting may be associated with a "Mona Lisa(painting)," semantic entity. The entity association application 132 may examine the text terms within the image documents to identify one or more entities for each document. Each entity and document pair may also be associated with a confidence value, the confidence value representing the likelihood that the document is related to that semantic entity. The entity matching may be performed in a variety of manners. For example, search queries may be generated based on one or more of the labels contained within the document. The entity database 138 may be searched using the generated search queries to identify the most likely entity or entities. The entity association application 132 may rely on the context of the documents 140. For example, if there are many labels related to movies within the document 140, then the entity association application 132 may infer that the image is about a movie.

The server image search application 134 functions to perform image search and analysis functions, such as identifying similar images and providing search results in response to receiving a target image. The server image search application 134 may interface with the client image search application 116 to perform image search operations. The server image search application 134 may also compare source images stored within the image database 136 with one another and with target images provided by the client device 102 to identify similar images. For example, the server image search application 134 may identify images with similar objects, text, colors, or other features as known in the art to identify images that are similar to one another, such as using optical character recognition techniques or pixel-by-pixel comparison. These similar images may be used to identify image search results, associated semantic entities, and other features of the image search operation. Similar images may be subimages of one another. For example, if the target image is a photo of a jaguar with one background (e.g., a back yard) but the source image has a jaguar with a completely different background (e.g., a forest), these two images may still be identified as similar to one another.

The image database 136 and entity database 138 may be located external to the server 104. For example, the image database 136 and the entity database 138 may be maintained in a public manner in an open-source format.

The client device 102, and the server 104 may each be at separate nodes of a network and be operative to directly and indirectly communicate with other nodes of the network 106. For example, the client device 102 may comprise a mobile phone that is operative to communicate with the server 104 via the network 106.

The network 106, and the intervening nodes between the client device 102 and the server 104 may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, hypertext transfer protocol ("HTTP") and simple mail transfer protocol ("SMTP"), and various combinations of the foregoing. It should be appreciated that a typical system may include a large number of connected computers. For example, the functionality of the server 104 may be spread across multiple nodes, with separate nodes hosting the image database 136, the entity database 138, and the server image search application 134.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system.

Figure 2:
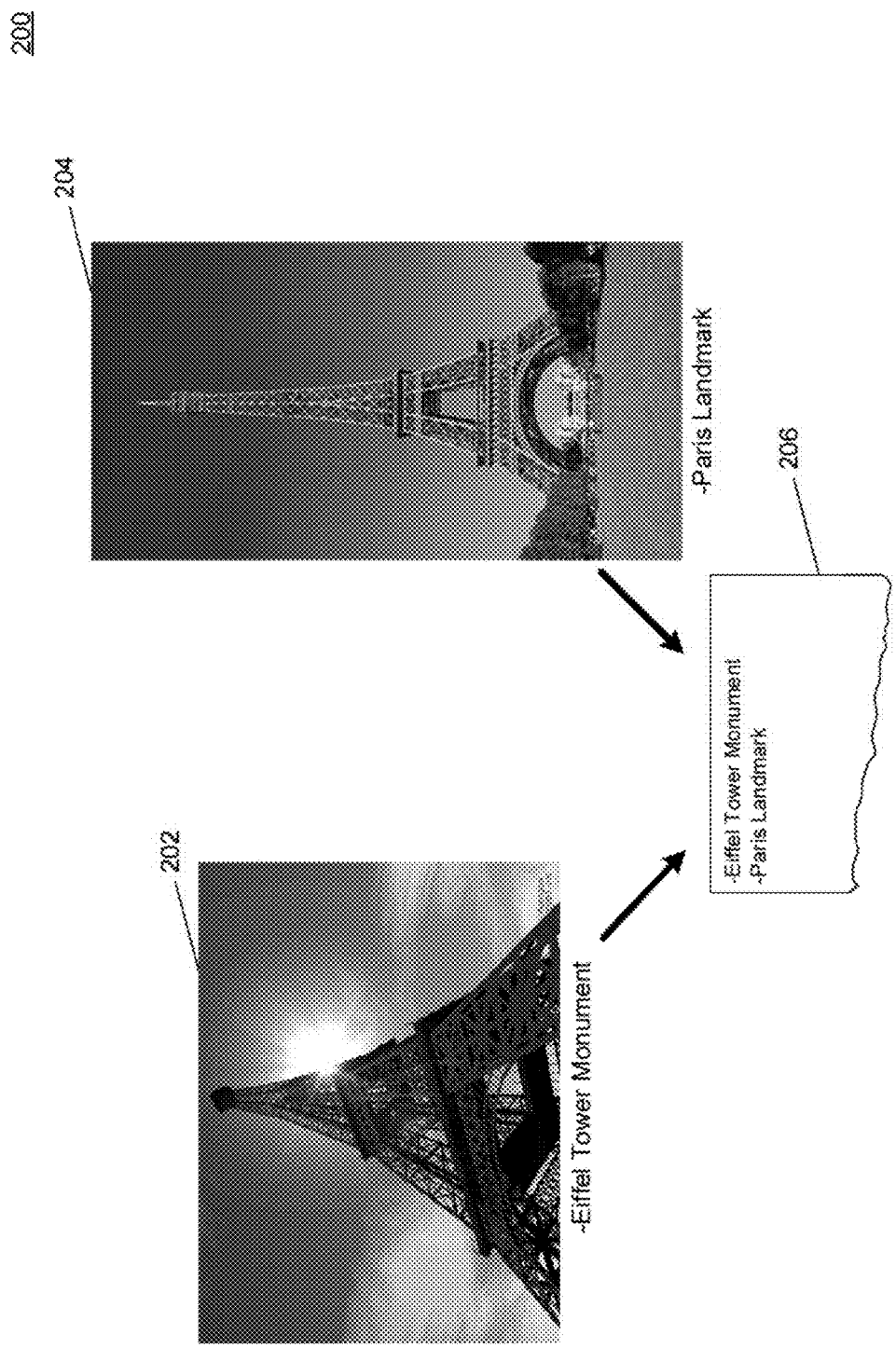
FIG. 2 is a block diagram depicting an example of an image label propagation process in accordance with aspects of the disclosure.

FIG. 2 is a diagram depicting an example of an image label propagation process 200 in accordance with aspects of the disclosure. A first image 202 and a second image 204 each depict the Eiffel tower, a landmark in Paris, France. Both images are similar in content, though not identical. The first image 202 is associated with the label "Eiffel Tower Monument," and the second image 204 is associated with the label "Paris Landmark." During the document generation process as described above, similar images such as the first image 202 and the second image 204 may have their labels propagated across the documents 206 associated with the images, such that the resulting documents 206 include labels from each similar image.

Figure 3:
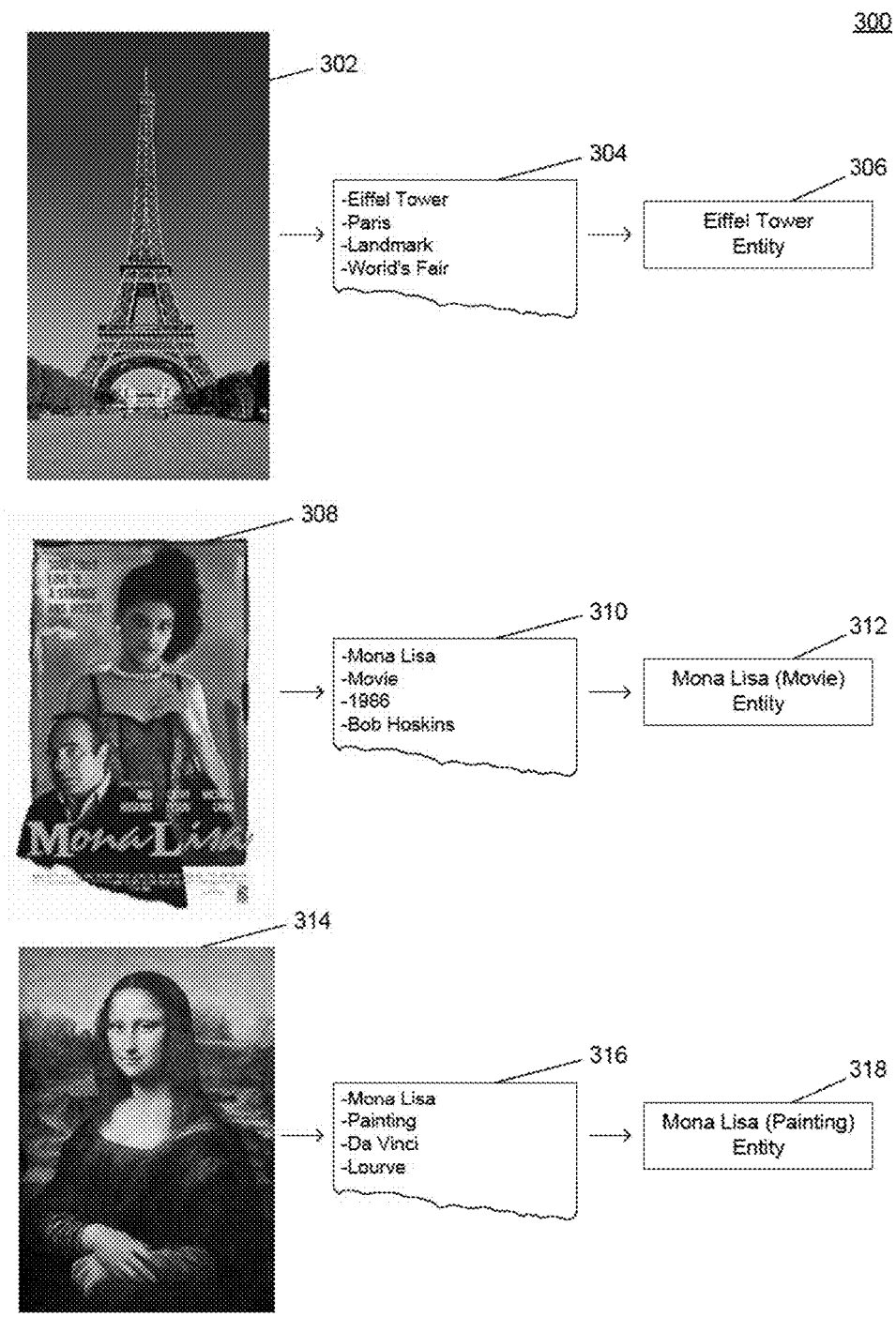
FIG. 3 is a block diagram depicting an example of images associated with semantic entities in accordance with aspects of the disclosure.

FIG. 3 is a diagram depicting an example of source images associated with semantic entities in accordance with aspects of the disclosure. Each of the depicted images 302, 308, 314 is associated with a corresponding document 304, 310, 316 as described above (see FIG. 1). The documents 304, 310, 316 list the labels associated with the corresponding image. These labels are analyzed to identify a semantic entity 306, 312, 318 for association with the source image. For example, an entity association application may perform a search using the labels of the second document 310 to identify the semantic entity of the 1986 movie, "Mona Lisa," starring Bob Hoskins. A search of the labels associated with the third document 316 may identify the painting "Mona Lisa," by Leonardo DaVinci, stored at the Louvre museum.

FIG. 3 also depicts the disambiguation process as provided by the semantic entity linking operation. The second image 308 is associated with a poster for the movie "Mona Lisa," and the third image 314 is associated with the painting "Mona Lisa," by Leonardo DaVinci. As such, if the most relevant text for each image were used to perform a search query, the search query would return results for "Mona Lisa." Although the this search query might return accurate results for the most frequent use of the term (e.g., the painting), such results are not relevant for the second image 308, even though the text associated with the image might be the same as the text associated with the third image 314. By searching using the semantic entity, or returning the semantic entity as a result, the search results provided to the user more accurately relate to the target image provided by the user. For example, rather than returning results for the Mona Lisa painting, the results for the second image 308 based on the Mona Lisa (movie) semantic entity 312 might relate to the plot, characters, and images from the movie rather than the painting associated with the plain text of the title.

Figure 4:
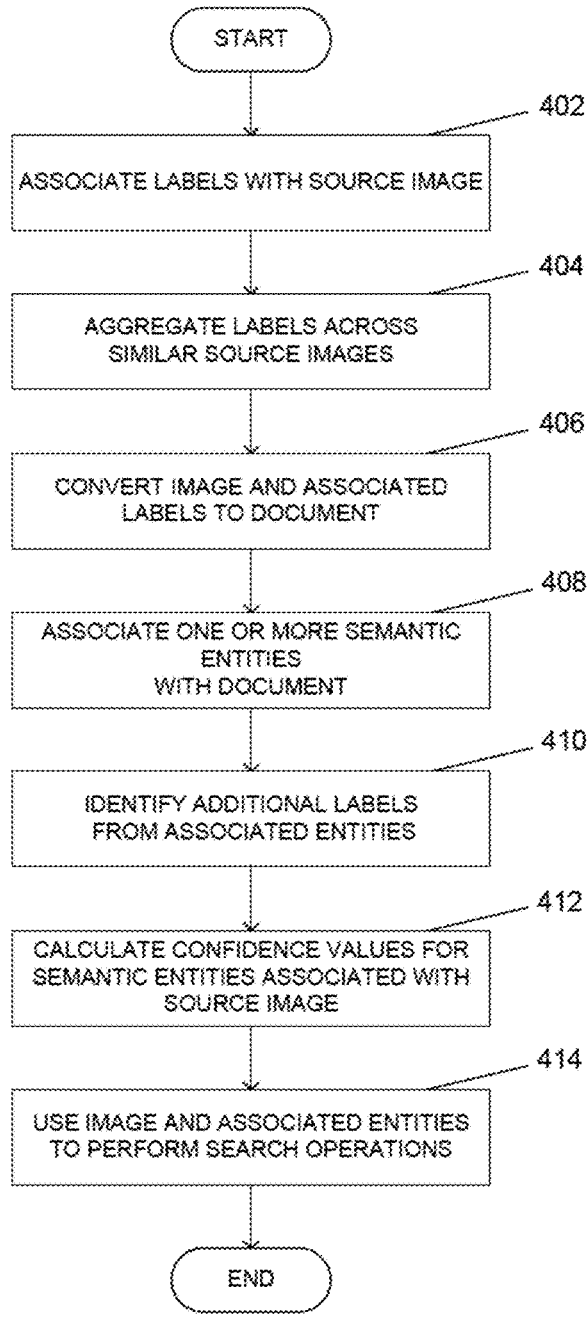
FIG. 4 is a flow diagram depicting an example of a method for associating images with semantic entities in accordance with aspects of the disclosure.

FIG. 4 is a flow diagram depicting an example of a method 400 for associating source images with semantic entities in accordance with aspects of the disclosure. The method 400 operates to associate source images from an image database with one or more semantic entities. For example, the method 400 may associate each image with one or more Freebase entries or Wikipedia articles. Once associated with a semantic entity or entities, the source image may be made available in image search operations to associate a target image with a particular semantic entity. A given image may be associated with multiple semantic entities, and each entity association may have a computed confidence value, indicating how likely that image is to be associated with that particular semantic entity.

At action 402, labels may be associated with source images in an image database. As described above (see FIG. 1), the labels may be applied based on the frequency with which particular images appear in search results for search queries, such that the text of the search query is used for images frequently associated with that query. Labels may also be associated with the source images in other manners, such as by manual application of labels by users, optical character recognition techniques, image comparison operations, or by other methods.

At action 404, labels may be aggregated across similar images. Images may be identified as being similar by a variety of image recognition techniques, including side-by-side comparison of images, identification of common objects within the images, pixel-by-pixel comparison, and other techniques. Aggregating the image labels in this manner ensures that as many relevant labels are associated with each image as possible, thus providing the maximum amount of data to match the image with a particular semantic entity at action 408.

At action 406, the source image and its associated labels are converted to a document. The document contains the labels associated with the image. The document may further contain additional data, such as the image itself, a reference to the image, and a reference to related images. The document may also allow for association with one or more semantic entities and confidence values associated with those semantic entities.

At action 408, the document is analyzed to identify one or more semantic entities. For example, as described above, a search operation may be performed to identify a web page associated with the text of the labels associated with the image as stored in the document (see FIGS. 1 and 3). The association between the source image and the semantic entities may be stored in a separate data structure or, as described above with respect to action 406, the semantic entities associated with the image may be stored within the document itself.

At action 410, additional labels may be applied to the source image based on the identified semantic entities associated with the image. A web page associated with the semantic entity (e.g., a Freebase page or Wikipedia article) may be parsed to extract additional relevant details about the image. For example, an image associated with a film may identify each actor in the film as an additional label, or an image associated with a location may identify the latitude and longitude coordinates of the location as labels.

At action 412, confidence values may be calculated for each entity associated with the image. These confidence values represent the likelihood that the image is associated with that particular entity. As described above, each source image may be associated with multiple entities, and some entities may be a better match than others. For example, a photograph of a Jaguar automobile may be associated with entities for "Jaguar (car manufacturer)," and "automobile." Because the Jaguar entity is more specific and directly relevant to the object in the image, this entity may be associated with a higher confidence value than the generic term "automobile." These confidence values may be used during the search operation to disambiguate between groups of similar images.

At action 414, the source images and associated semantic entities may be used to provide image search results. A method for utilizing images linked to semantic entities to provide search results is described further below (see FIG. 5).

Figure 5:
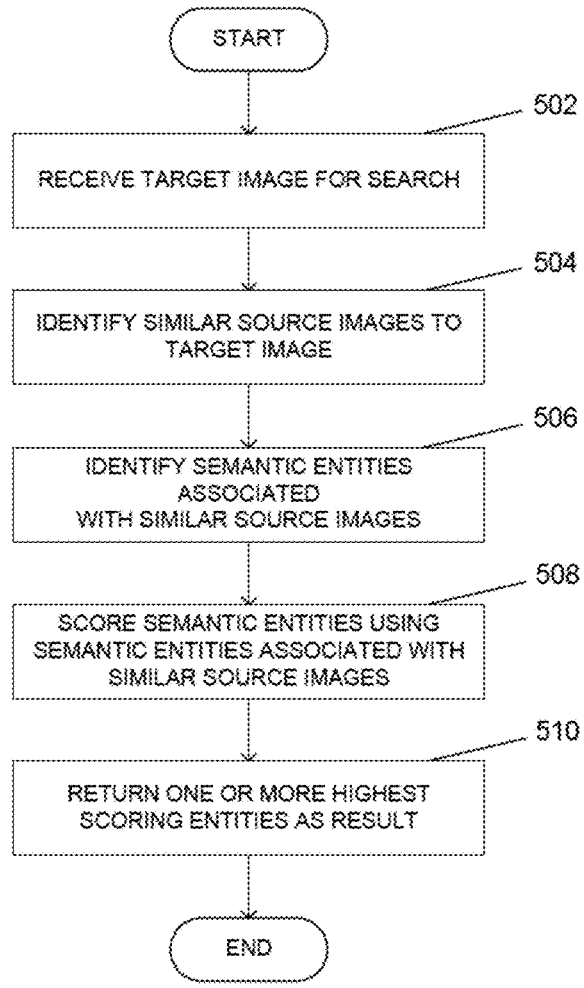
FIG. 5 is a flow diagram depicting an example of a method for performing an image search using semantic entities in accordance with aspects of the disclosure.

FIG. 5 is a flow diagram depicting an example of a method 500 for performing an image search using semantic entities in accordance with aspects of the disclosure. Once source images in an image database have been associated with semantic entities, it is possible to provide more accurate search results by using similar images to identify a representative semantic entity for a given target image. These search results are provided based on the most likely entity related to the target image, rather than a particular text string associated with the image. Thus results that are directly relevant to the target image may be provided, eliminating cases where the same text may refer to very different concepts, such as the "Mona Lisa" example provided above with respect to FIG. 3.

At action 502, the target image for the search operation is received. As described above, the target image may be received by at a server from a client device to perform a search based on the received image (see FIG. 1).

At action 504, similar source images to the target image are identified. As described above, the similar source images are identified from an image database, where one or more of the images in the image database are associated with semantic entities. These similar source images may be identified in the manner described above (see FIGS. 1 and 4), and via other image analysis techniques as known in the art. The similar source images may be assigned a score based on their similarity to the target image, such that images that are most similar to the target image receive a highest score.

At action 506, semantic entities associated with the similar source images are identified. As described above, each source image within the database may be associated with one or more semantic entities. The source images may further be associated with particular semantic entities with particular confidence value, indicating the likely relevance of a particular semantic entity with a particular image.

At action 508, a best semantic entity or semantic entities for association with the target image are identified by a scoring process, using the semantic entities associated with the similar images. For example, the similar source images may be analyzed to identify the semantic entity that appears most frequently among all of the similar source images. The most frequent semantic entity may thus be identified as the best entity for association with the target image. Alternately, semantic entities with the highest confidence value among source images that are most similar to the target image may be rated more highly than semantic entities associated with less similar images. For example, if a high percentage of the similar source images are associated with a particular semantic entity, that semantic entity may be identified as the best semantic entity, even if the confidence value is low on each individual similar image. Alternately, if a particular source image is extremely similar or identical to the target image, then the highest confidence entity associated with the nearly-identical image may be identified as the best semantic entity. A variety of weighting factors may be associated with scoring the semantic entities, including but not limited to the similarity of the target image with a particular similar source image and the confidence value of each semantic entity associated with a particular similar source image. The weights for the scoring operation may be determined dynamically, such as, for example, assigning a greater weight to image similarity for some image categories and a greater weight to the entity confidence value for other categories.

At action 510, the best semantic entity or entities are used to provide search results for the target image. These search results may include images, text, hyperlinks, or data in other formats. The semantic entities may be provided as results in and of themselves (e.g., as a link to a Freebase or Wikipedia page), or utilized to perform additional search operations, such as by identifying additional text to include in a search query. Multiple semantic entities may be provided in response, such as by identifying each semantic entity scoring above a particular threshold value as a search result.

Providing search results based on semantic entities in this manner allows for disambiguation of search queries that might not be otherwise possible. For example, if a user wishes to perform a search for the 1986 movie "Mona Lisa," then the search query may extract relevant data from the Freebase article to create a search query "Mona Lisa 1986 movie" to eliminate results for the painting, thus disambiguating the associated search query.

The stages of the illustrated methods are not intended to be limiting. The functionality of the methods can exist in a fewer or greater number of stages than what is shown and, even with the depicted methods, the particular order of events may be different from what is shown in the figures.

The systems and methods described herein advantageously provide for an improved method and system for performing searches based on target images. By associating source images with semantic entities, more accurate searching is possible in circumstances where images may be associated with text that is otherwise ambiguous. By associating images within a database with semantic entities prior to the search operation, similar images may be identified for efficient matching to previously identified semantic entities without the need to identify entity associations with images stored in the database at the time of the search operation. The use of confidence values and multiple semantic entity associations for the images allows for a flexible semantic entity matching technique that may be weighted to ensure accuracy of the matched semantic entity.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A method for performing an image search using semantic entities, the method comprising:
   receiving, by one or more computing devices having one or more processors, a target image as a search query;
   identifying, by the one or more processors, at least one similar image that has at least one feature in common with the target image, the at least one similar image associated with one or more semantic entities, wherein each semantic entity defines a concept with a particular ontology;
   determining, by the one or more processors, at least one likely semantic entity to describe the target image using the one or more semantic entities associated with the at least one similar image; and
   using, by the one or more processors, the at least one likely semantic entity to provide search results for the target image.

2. The method of claim 1, further comprising:
   determining a score for each of the one or more semantic entities; and
   identifying a semantic entity with a highest determined score as the at least one likely semantic entity.

3. The method of claim 2, wherein the score for each of the semantic entities is determined based on a similarity of the at least one similar image to the target image.

4. The method of claim 2, wherein the score for each of the one or more semantic entities is determined based on a confidence value indicating a likelihood that each of the one or more semantic entities is correctly associated with the at least one similar image.

5. The method of claim 1, further comprising providing the at least one likely semantic entity as a search result.

6. The method of claim 1, further comprising:
   using the at least one likely semantic entity to generate a search query;
   performing a search using the search query; and
   returning one or more results of the search as search results for the target image.

7. The method of claim 1, wherein the at least one similar image is associated with the one or more semantic entities by a method comprising:

analyzing contents of a first document associated with the at least one similar image to determine the one or more semantic entities for association with the at least one similar image, the first document comprising one or more labels associated with the at least one similar image;

storing data indicating an association of the at least one similar image with the at least one likely semantic entity; and identifying the at least one likely semantic entity for the target image using the association of the at least one similar image with the at least one likely semantic entity.

8. The method of claim 1, wherein the at least one similar image includes a plurality of images similar to the target image, and the method further comprises:

identifying a most frequently occurring semantic entity from all of the semantic entities associated with the plurality of images, and wherein the most frequently occurring semantic entity is determined to be the at least one likely semantic entity.

9. A non-transitory computer readable storage medium comprising instructions, that when executed by a processor, causes the processor to perform a method comprising:

receiving a target image as a search query;

identifying at least one similar image from among a plurality of source images, the at least one similar image having at least one feature in common with the target image, the at least one similar image associated with one or more semantic entities wherein each semantic entity defines a concept with a particular ontology;

determining at least one likely semantic entity to describe the target image using the one or more semantic entities associated with at least one similar image; and using the at least one likely semantic entity to provide search results for the target image.

10. The non-transitory computer readable storage medium of claim 9, further comprising:

determining a score for each of the one or more semantic entities; and identifying a semantic entity with a highest determined score as the at least one likely semantic entity.

11. The non-transitory computer readable storage medium of claim 10, wherein the score for each of the one or more semantic entities is determined by similarity of the at least one similar image to the target image.

12. The non-transitory computer readable storage medium of claim 9, further comprising providing the at least one likely semantic entity as a search result.

13. The non-transitory computer readable storage medium of claim 9, further comprising:

using the at least one likely semantic entity to generate a search query;

performing a search using the search query; and returning one or more results of the search as search results for the target image.

14. The non-transitory computer readable storage medium of claim 9, further comprising:

analyzing contents of a first document associated with the at least one similar image to determine the one or more semantic entities for association with at least one similar image, the first document comprising one or more labels associated with the at least one similar image;

storing data indicating an association of the at least one similar image with the at least one likely semantic entity; and identifying the at least one likely semantic entity for the target image using the association of the at least one similar image with the at least one likely semantic entity.

15. A processing system for performing an image search using semantic entities, the processing system comprising:

a memory for storing one or more source images and one or more semantic entities associated with at least one of the one or more source images wherein each semantic entity defines a concept with a particular ontology;

at least one processor coupled to the memory, the processor configured to:

receive a target image as a search query;

identify at least one similar image among the one or more source images, the at least one similar image having at least one feature in common with the target image;

determine at least one likely semantic entity to describe the target image using the semantic entities associated with the at least one similar image; and use the at least one likely semantic entity to provide search results for the target image.

16. The processing system of claim 15, wherein the at least one processor is further configured to:

determine a score for each of the one or more semantic entities; and identify a semantic entity with a highest determined score as the at least one likely semantic entity.

17. The processing system of claim 16, wherein the score for each of the semantic entities is determined by similarity of the at least one similar image to the target image.

18. The processing system of claim 15, wherein the processor is further configured to provide the at least one likely semantic entity as a search result.

19. The processing system of claim 15, wherein the processor is further configured to:

use the at least one likely semantic entity to generate a search query;

perform a search using the search query; and return one or more results of the search as search results for the target image.

20. The processing system of claim 15, wherein the processor is further configured to:

analyze contents of a first document associated with the at least one similar image to determine the one or more semantic entities for association with the at least one similar, the first document comprising one or more labels associated with the at least one similar image;

store data indicating an association of the at least one similar image with the at least one likely semantic entity; and identify at least one likely semantic entity for the target image using the association of the at least one similar image with the at least one likely semantic entity.

* * * * *